UNITED STATES PATENT OFFICE.

EMANUEL LONDON, OF NEW YORK, N. Y.

MOUTH WASH.

1,416,666.  Specification of Letters Patent.  Patented May 16, 1922.

No Drawing.   Application filed November 3, 1921.  Serial No. 512,507.

*To all whom it may concern:*

Be it known that I, EMANUEL LONDON, a citizen of the United States, and resident of city of New York, in the county of Kings and State of New York, have invented certain new and useful Improvements in Mouth Washes, of which the following is a specification.

The object of my invention is to provide a mouth wash to be used in connection with the cure of "pyorrhea alveolaris" or Riggs' disease.

The only form of aids to instrumentation known to the applicant used in connection with pyorrhea are in the form of pastes. Such pastes have not the constituents of applicant's wash. They have the great disadvantage inherent in pastes of not being able to reach all parts of the oral cavity and of containing acids, which have a tendency to accentuate the acid condition, which my mouth wash has as one of its objects to remedy.

Pyorrhea is characterized by a formation of pus and an accumulation of tartar on the surfaces of the teeth between the outer surfaces of the latter and the peridental membrane of the gums. In aggravated cases it always results in shrinking of the gums and ultimate falling out of the teeth, even though the teeth themselves might be perfectly sound and free from decay.

Investigation has shown that practically all diseases of a germ character have their origin through the "portal of entry"—the mouth. If, on entry, these malignant bodies find feeding ground in decayed or unclean roots, they multiply and supply myriads of re-inforcements to those germs that have already attacked some other spot of least resistance, which is the diseased part of the body.

While it is necessary for physical removal of the diseased parts and tartar or calculous deposits to use instruments, I have found in my practice that it is essential to have a mouth wash that kills the germs, strengthens the gums so that instruments can be used without undue pain to the patient, and restores the oral cavity to a healthy condition.

The invention is for such a mouth wash containing in combination, a germicide, an astringent and a cleansing agent, which will perform their respective functions at the same time and still not neutralize one another or cause harmful or negative results.

I have found that my pyorrhea mouth wash accomplishes the best results when using the following combination:

| | Parts. |
|---|---|
| Chlorate of potash | 10 |
| Fluid extract *Hamamelis virginiana* | 65 to 100 |
| Grain alcohol | 25 |

In actual practice I take the solution as above set forth and put one-half teaspoon to a glass of water for moderate cases.

For more acute cases one teaspoon is added to a glass of water and for acute cases two teaspoons should be used.

The chlorate of potash in its action serves the function of a germicide, liberating the oxygen from the chlorate of potash and killing the germs and bacteria that are contained in the pyorrhea pockets or in other places in the oral cavity.

The fluid extract *Hamamelis virginiana* is a strong astringent and thereby contracts or draws together the gums, which serves the purpose of healing and strengthening them so as to cause them to come again in contact with the teeth as when in normal condition.

The alcohol is for a cleansing or an antiseptic purpose. It dissolves food particles and other particles found in the oral cavity as a result of instrumentation. It is important that the mouth wash act as a germicide, astringent and cleansing agent at the same time. These three constituents work together and perform their beneficial functions at the same time without neutralizing or negativing one another or causing a harmful combination.

Chlorate of potash, a powder, will not dissolve in alcohol, so the fluid extract *Hamamelis virginiana* not only serves as an astringent, but dissolves the chlorate of potash, and makes it possible to have the chlorate of potash in combination with the alcohol in liquid form, thereby securing the combination in a form that can reach all parts of the oral cavity.

In incipient cases my pyorrhea mouth wash will cure pyorrhea without need of instrumentation.

I find that, in practice, where the gum tissue is so sore that the slightest touch causes the gums to bleed and, therefore, the patient is not in condition for instrumentation, the application of my pyorrhea mouth wash three times a day for a short period so strengthens the gums and other tissues in the oral cavity that the teeth may be operated upon with instruments without causing the gums to bleed. This is a great relief to the patient, because most of the instrumentation is on the roots of the teeth, and the gums must be strengthened before the patient can stand the necessary manipulation in connection with the removal of calculous deposits.

My mouth wash is likewise applied when instruments are used to remove the calculous, by being squirted directly into the pus pockets.

Further, I find that this mouth wash renders the saliva, which in cases of pyorrhea is usually very acid in its reaction, more watery or neutral, thereby preventing the collection of calculous deposits around the gum margins, as the acid condition is the main cause of such deposits.

It is understood that the proportions of the ingredients above given may be slightly modified, although I find that the proportions above stated produce very beneficial results. Also other well known ingredients such as flavoring matter, coloring matter, etc., may be added without departing from the spirit and scope of my invention.

What I claim as my invention and desire to secure by Letters Patent is:

1. A mouth wash containing chlorate of potash in quantities sufficient to act as a germicide, fluid extract of *Hamamelis virginiana* in quantities sufficient to act as an astringent, and alcohol in quantities sufficient to act as a cleanser.

2. A liquid mouth wash composed of ten parts of chlorate of potash, from sixty-five to one-hundred parts fluid extract of *Hamamelis virginiana* and twenty-five parts alcohol.

Signed at New York city in the county of Kings and State of New York this 1st day of November, 1921.

EMANUEL LONDON.